United States Patent
Osada et al.

(10) Patent No.: US 7,341,304 B2
(45) Date of Patent: Mar. 11, 2008

(54) OPENING/CLOSING DEVICE FOR VEHICLE

(75) Inventors: Atsushi Osada, Yokohama (JP); Koichi Shiota, Yokohama (JP)

(73) Assignee: Ohi Seisakusho Co., Ltd. (JP)

( * ) Notice: Subject to any disclaimer, the term of this patent is extended or adjusted under 35 U.S.C. 154(b) by 0 days.

(21) Appl. No.: 11/226,002

(22) Filed: Sep. 14, 2005

(65) Prior Publication Data
US 2006/0055202 A1   Mar. 16, 2006

(30) Foreign Application Priority Data
Sep. 14, 2004  (JP)  ............................ P2004-266374

(51) Int. Cl.
*B60J 5/06* (2006.01)
(52) U.S. Cl. ................. 296/155; 296/146.1; 296/146.4
(58) Field of Classification Search ............. 296/146.1, 296/155, 146.4; 49/360, 352
See application file for complete search history.

(56) References Cited

U.S. PATENT DOCUMENTS

| | | | | |
|---|---|---|---|---|
| 5,316,365 | A * | 5/1994 | Kuhlman et al. ........... | 296/155 |
| 6,123,384 | A * | 9/2000 | Eustache et al. .......... | 296/146.2 |
| 6,390,535 | B1 * | 5/2002 | Chapman .................... | 296/155 |
| 6,539,670 | B2 * | 4/2003 | Haag et al. ................... | 49/141 |
| 6,866,250 | B2 * | 3/2005 | Kita ............................. | 254/225 |
| 7,100,326 | B2 * | 9/2006 | Shimada et al. ............. | 49/360 |
| 2002/0053168 | A1 * | 5/2002 | Tatsumi et al. ............. | 49/352 |
| 2004/0134130 | A1 * | 7/2004 | Dobson et al. ............... | 49/352 |
| 2004/0221510 | A1 * | 11/2004 | Fukumoto et al. .......... | 49/360 |
| 2004/0221511 | A1 * | 11/2004 | Rogers et al. ............... | 49/360 |
| 2005/0055883 | A1 * | 3/2005 | Sato et al. ................... | 49/360 |
| 2006/0068958 | A1 * | 3/2006 | Kita et al. ................... | 474/135 |

FOREIGN PATENT DOCUMENTS

JP   11-091355   4/1999

* cited by examiner

*Primary Examiner*—Dennis H. Pedder
*Assistant Examiner*—Mike Hernandez
(74) *Attorney, Agent, or Firm*—Kilpatrick Stockton LLP

(57) ABSTRACT

An opening/closing body for opening/closing an opening provided in a vehicle body, a pair of guide members, and a reel drum attached onto a board of a drive unit provided between both of the guide members, are provided. Respective one ends of a pair of wires are connected to the opening/closing body, and the wires are wound around the pair of guide members. Then, respective other ends of the pair of wires are connected to the reel drum so as to be reeled in directions reverse to each other. On the board of the drive unit, an extended portion extended toward one of the guide members is provided, and one of the guide members is attached onto the extended portion.

4 Claims, 5 Drawing Sheets

OPENING/CLOSING DEVICE FOR VEHICLE

BACKGROUND OF THE INVENTION

1. Field of the Invention

The present invention relates to an opening/closing device for a vehicle, which is for use, for example, in opening/closing the vehicular opening/closing body such as a sliding door and a sunroof of the vehicle.

2. Description of the Related Art

This type of opening/closing device of the opening/closing body is constructed in such a manner that one ends of a pair of wires are connected to the sliding door that opens/closes a side opening provided on a vehicle body, and that both of the wires are extended from a connected portion thereof in an opening/closing direction of the sliding door. Moreover, the wires are wound around a pair of guide members arranged on the vehicle body so as to be spaced from each other in a fore-and-aft direction as the opening/closing direction of the sliding door. Furthermore, the other ends of both of the wires are reeled to a reel drum attached onto a board of a drive unit provided between both of the guide members in the vehicle body from directions reverse to each other, the reel drum is rotated in one direction and a direction reverse thereto, and both of the wires are thus made to run around and along both of the guide members, thereby opening/closing the sliding door (for example, refer to Japanese Patent Laid-Open Publication No. H11-91355 (published in 1999)).

SUMMARY OF THE INVENTION

However, in the conventional opening/closing device, the front and rear pair of guide members and the drive unit have been attached onto the vehicle body independently and separately of/from one another, and accordingly, attachment work thereof has been complicated. Moreover, it has been cumbersome to position the respective guide members and drive unit, and owing to dislocation of attachment positions thereof, there have been possibilities that the wires are guided unsmoothly, and rub against the vehicle body and the like.

Moreover, though no problem occurs when the respective guide members are attached as separate bodies from the drive unit onto the vehicle body, in order to attach one of the guide members integrally with the drive unit onto a spot of the vehicle body, where there are variations particularly in a dimension and a shape in a-vehicle width direction, it has been necessary to perform corrections corresponding to the variations of the dimension, and the like, causing a problem that correction work thereof has been cumbersome.

In consideration of the problem as described above, which is inherent in the conventional technology, it is an object of the present invention to provide an opening/closing device for a vehicle, which is easy to attach and position onto the vehicle body, and is capable of easily absorbing the variations of the vehicle shape, attachment errors thereof onto the vehicle body, and the like.

To achieve the above object, there is provided an opening/closing device for a vehicle, including: an opening/closing body for opening/closing an opening provided in a vehicle body; a pair of guide members arranged on the vehicle body to be spaced from each other in an opening/closing direction of the opening/closing body; a drive unit provided between the guide members; a reel drum attached onto a board of the drive unit, the reel drum being rotatable in one direction and a direction reverse thereto; wires having ends connected to the opening/closing body, extended from a connected portion thereof in the opening/closing direction of the opening/closing body while being wound around both of the guide members and connected to the reel drum to be wound around the reel drum in directions reverse to each other, the wires running around and along both of the guide members and opening/closing the opening/closing body by rotating the reel drum in the one direction and the direction reverse thereto; and an extended portion provided to be extended from the board of the drive unit toward one of the guide members, and attached onto the one of the guide members.

According to the feature of the present invention, either one of the guide members can be attached integrally with the drive unit onto the vehicle body, and accordingly, attachment work and positioning thereof to the vehicle body is facilitated.

The extended portion may include: a deformable portion provided on a base thereof; and a guide member attachment portion and a fixed portion to the vehicle body, the guide member attachment portion and the fixed portion being provided close to a tip end thereof.

With the above-described construction, in the case of attaching the board in the drive unit and the fixed portion of the extended portion thereof to the vehicle body, the fixed portion of the extended portion is attached onto the vehicle body while bending the deformable portion on the base of the extended portion, thus making it possible to easily absorb the variations in the dimension and shape of the vehicle body, the attachment errors of the opening/closing device onto the vehicle body, and the like. Hence, one of the guide members can be surely fixed to the vehicle body, and in addition, sealing property thereof can also be improved.

Each of the guide members may include a guide pulley for guiding the wire.

With the above-described construction, the wire can be guided smoothly by the guide pulley.

Each of the guide members may include: a pulley holder pivotally attached onto a tip end of the extended portion by a shaft oriented in a direction perpendicular to a longitudinal direction of the extended portion, and thrust on the vehicle body through a packing; a guide pulley for guiding the wire, the guide pulley being pivotally attached onto the pulley holder by the shaft; and a flexible sheath tube for guiding the wire, the sheath tube having both ends connected to the pulley holder and a portion of the extended portion, which is close to a base of the extended portion.

With the above-described construction, even if there are variations in the shape of the vehicle body, and there are errors on the attachment position of the guide member onto the vehicle body, the pulley holder can be surely fixed to the vehicle body. In addition, variations of an orientation of the pulley holder with respect to the extended portion, variations of positions of both ends of the sheath tube and a linear distance therebetween, which are accompanied with the above-described variations of the orientation, and the like, can be absorbed by bending the sheath tube. In such a way, the wire can always be guided smoothly.

DETAILED DESCRIPTION OF THE PREFERRED EMBODIMENT

Figure 1:
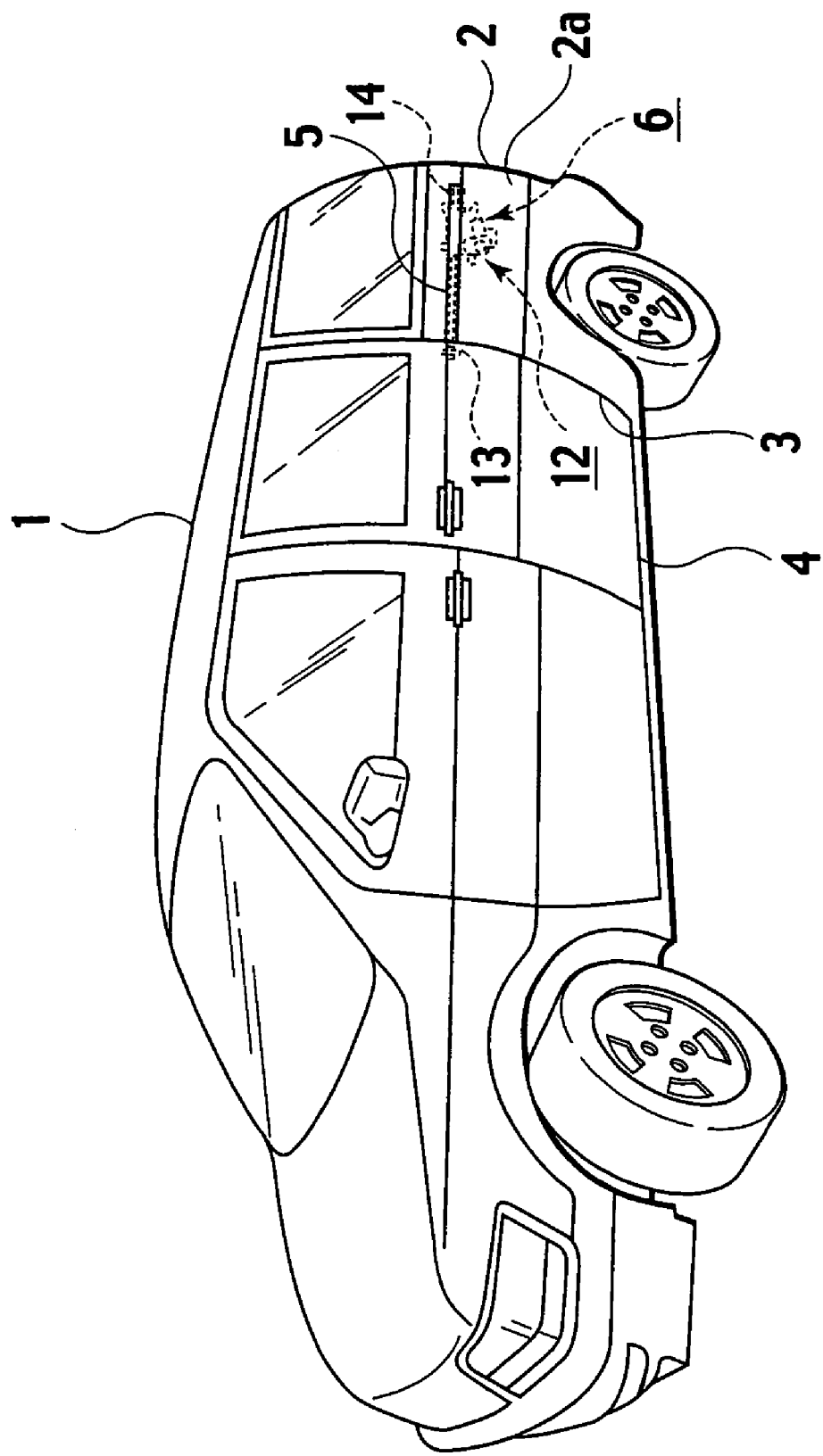
FIG. 1 is a perspective view showing a left side of a vehicle, in which an opening/closing device for a vehicle according to an embodiment of the present invention is provided, thereby opening/closing a sliding door provided on a left side of a vehicle body.

An embodiment of the present invention is described below based on the drawings. In the description below with reference to the drawings, the same or similar reference numerals are assigned to the same or similar portions.

FIG. 1 is a perspective view showing a left side of a vehicle adapted to open/close a sliding door provided on a left side of a vehicle body by the embodiment of the opening/closing device of the present invention.

Note that, though a sliding door on a right side of the vehicle body is made to open/close by a left-and-right symmetric similar construction to the above-described construction, illustration and detailed description thereof are omitted.

As shown in FIG. 1, a sliding door 4 is an opening/closing body that opens/closes an opening provided in an intermediate portion of a side panel 2 of a vehicle body 1. The sliding door 4 is guided by an upper rail (not shown) provided on an upper edge of the opening 3 on the side panel 2, a lower rail (not shown) provided on a lower edge thereof in the same way, and a waist rail 5 provided on an intermediate-level portion of a rear portion of the side panel 2 and oriented in a fore-and-aft direction. left in FIG. 1 is a forward. In addition, by an opening/closing device 6 of the present invention, the sliding door 4 is set movable between a full-close position shown in FIG. 1, where the opening 3 is closed, and a full-open position (not shown) where the sliding door 4 has moved backward from the full-close position along the side panel 2 while moving outer sideward to some extent from an outer side surface of the side panel 2.

Figure 2:
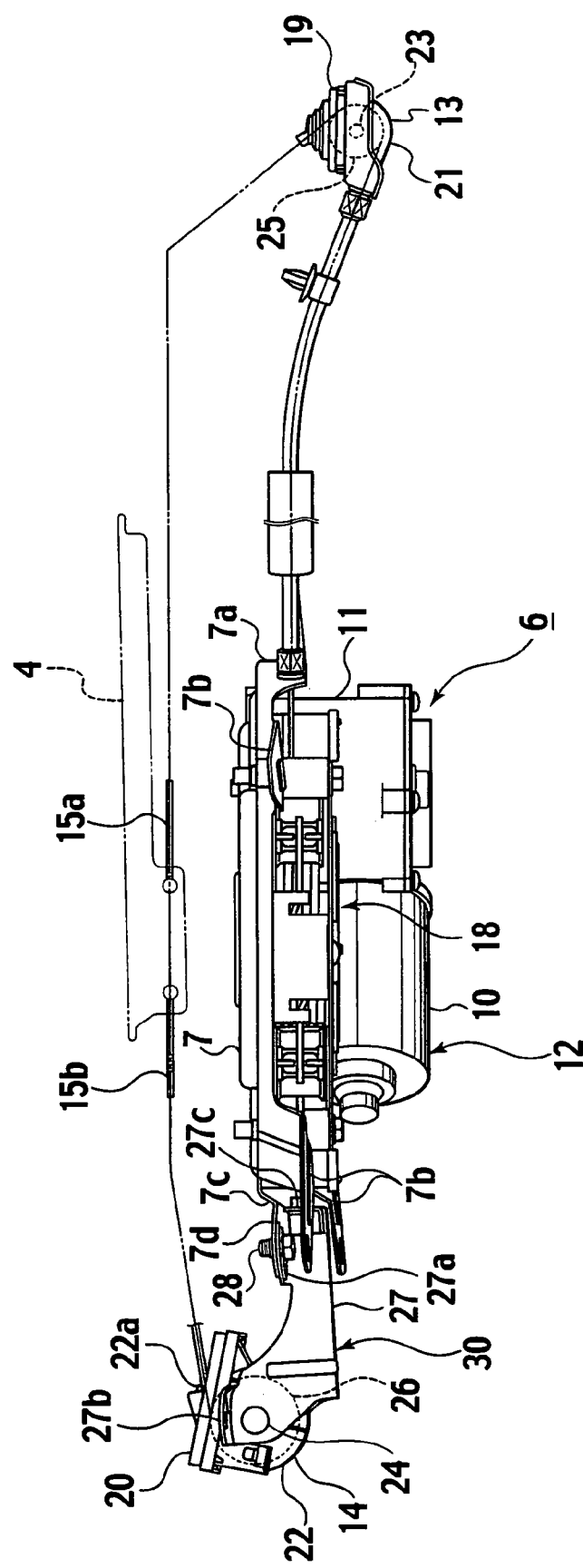
FIG. 2 is a plan view of the opening/closing device for a vehicle according to the embodiment of the present invention.
Figure 3:
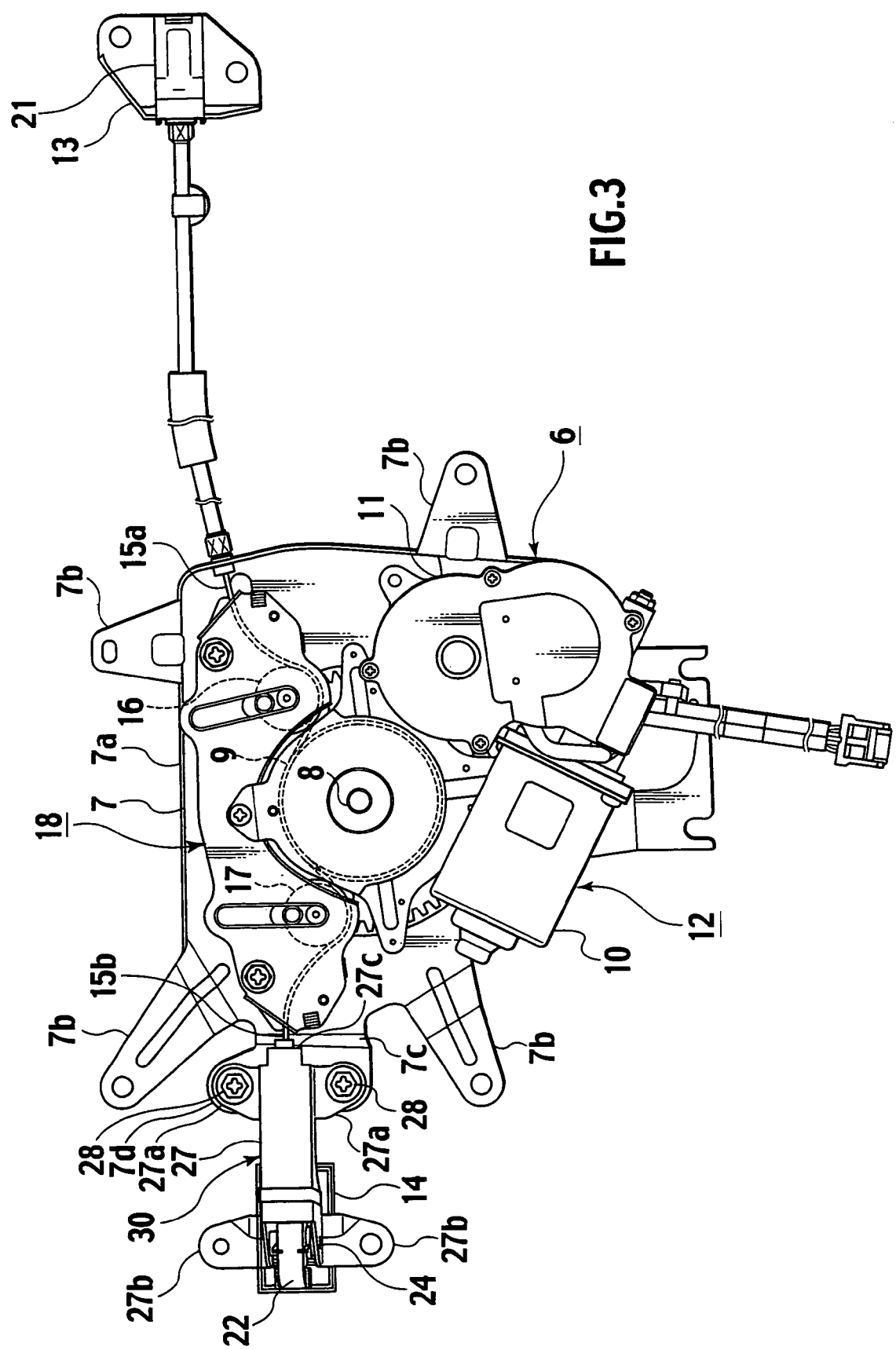
FIG. 3 is a side view of the opening/closing device for a vehicle according to the embodiment of the present invention, viewed from a vehicle inside.

FIG. 2 is a plan view of the opening/closing device 6, and FIG. 3 is a side view of the opening/closing device 6, viewed from a vehicle inside. Note that a right direction in FIG. 2 and FIG. 3 is the forward, an upper side of FIG. 2 is a vehicle outside, and a lower side thereof is the vehicle inside.

As shown in FIGS. 1 to 3, the opening/closing device 6 includes a drive unit 12 in which a reel drum 9 pivotally supported by a shaft 8 oriented crosswise on a board 7 fixed to a surface of the side panel 2 on the vehicle inside is rotated by a positively/reversely rotatable motor 10 provided on the board 7 through a reduction mechanism 11 in an opening direction as a clockwise direction in FIG. 3 and in a closing direction as a counterclockwise direction in FIG. 3. Moreover, the opening/closing device 6 includes a pair of guide members 13 and 14, a door-closing wire 15a, and a door-opening wire 15b. The guide members 13 and 14 are provided on front and rear portions of the waist rail 5 on the side panel 2. The door-closing wire 15a is formed of a wire, a cable, or the like which has one end connected to an inner surface of the sliding door 4, is extended forward from the connected portion, is wound around the front guide member 13 in a substantially U-shape when viewed from the above, and has the other end connected to the reel drum 9 and wound around the reel drum 9 counterclockwise from an upper portion of the reel drum 9. The door-opening wire 15b is similar to the wire 15a. The door-opening wire 15b has one end connected to the inner surface of the sliding door 4, is extended backward from the connected portion, is wound around the rear guide member 14 in a substantially U-shape when viewed from the above, and has the other end connected to the reel drum 9 and wound around the reel drum 9 clockwise from the upper portion of the reel drum 9.

The wires 15a and 15b may be made of one continuous wire, and an intermediate portion thereof may be connected to the sliding door 4, or an end thereof may be connected to the sliding door 4. The wires 15a and 15b may also be implemented by increasing the winding numbers thereof so as not to be misaligned from the reel drum 9.

Moreover, above the reel drum 9 provided on the board 7 of the drive unit 12, there is provided a tensioner 18 for preventing the slack of the wires 15a and 15b by pressing tension roller 16 and 17 onto the wires 15a and 15b.

The guide members 13 and 14 include pulley holders 21 and 22 attached onto the side panel 2 through packings 19 and 20, and guide pulleys 25 and 26 which are pivotally attached onto the respective pulley holders 21 and 22 by shafts 23 and 24 oriented in the vertical direction, and have the wires 15a and 15b wound substantially halfway around the guide pulleys 25 and 26 concerned. Here, in place of the guide pulleys 25 and 26, either one or both of the guide members 13 and 14 may include circular or semicircular arc fixed guide shoes (not shown) in which outer circumferential surfaces around which the wires 15a and 15b are wound are formed of a smooth material.

An edge portion 7a oriented toward the vehicle inside is formed on a peripheral edge of the board 7 in the drive unit 12. On plural spots of the edge portion 7a, attachment pieces 7b for fastening the board 7 therethrough to the surface of the side panel 2 on the vehicle inside by stop screws are provided. Note that, in this example, the side panel 2 forms a double-wall structure in which a hollow portion is formed between an outer panel 2a on the vehicle outside and an inner panel (not shown) on the vehicle inside.

Between the upper and lower attachment pieces 7b and 7b in a rear end portion of the board 7, a bracket attachment piece 7d oriented backward is provided continuously therewith through a deformable portion 7c inclined backward to some extent and oriented toward the vehicle inside. To the bracket attachment piece 7d, attachment pieces 27a and 27a formed on upper and lower portions of a front end of a bracket 27 formed in a U-shape viewed from the front, which is oriented in the fore-and-aft direction, are fixed by stop screws 28 and 28. An extended portion 30 is formed by the bracket attachment piece 7d and the bracket 27, which are extended backward from the deformable portion 7c. Specifically, the deformable portion 7c is provided on a base of the extended portion 30.

The pulley holder 22 in the rear guide member 14 is pivotally attached onto a rear end portion of the bracket 27 as a guide member attachment portion by the shaft 24 of the guide pulley 26. The attachment pieces 27b and 27b are fixed portions to the vehicle body 1. The attachment pieces 27b and 27b are formed on upper and lower portions of a rear end of the bracket 27 in the following manner. With regard to the pulley holder 22 in the guide member 14, an outside outlet 22a of the wire 15b is made to face to an opening 29 (refer to FIGS. 4A to 4C) provided in the outer panel 2a in the side panel 2, and the pulley holder 22 is thrust on a surface of the outer panel 2a on the vehicle inside through the packing 20. Specifically, on a portion of the extended portion 30, which is close to a tip end thereof, the guide member attachment portion and the fixed portions to the vehicle body are provided.

As described above, the attachment pieces 27b and 27b are abutted on the surface of the outer panel 2a on the vehicle inside, and are screwed thereto, thus making it possible to easily and surely attach the rear guide member 14 to the side panel 2. Moreover, since the rear guide member 14 is attached integrally with the drive unit 12 onto the vehicle body, attachment work and positioning thereof to the vehicle body is facilitated.

Moreover, the deformable portion 7c is formed of metal, resin, or the like, and is deformable. In this case, even if there are some variations in a positional relationship between the board 7 attached onto the inner panel (not shown) in the side panel 2 and the opening 29 in the outer panel 2a, the extended portion 30 is somewhat inclined in the vertical direction and the crosswise direction owing to the deformation of the deformable portion 7c, and absorbs the above-described variations. In any case, the rear guide member 14 can be easily and surely attached onto a normal position in the side panel 2. Moreover, the extended portion 30 can easily absorb variations in a dimension and shape of the vehicle, attachment errors of the opening/closing device 6 onto the vehicle body, and the like. Hence, one of the guide members can be surely fixed to the vehicle body, and in addition, sealing property thereof can also be improved.

Figure 4A:
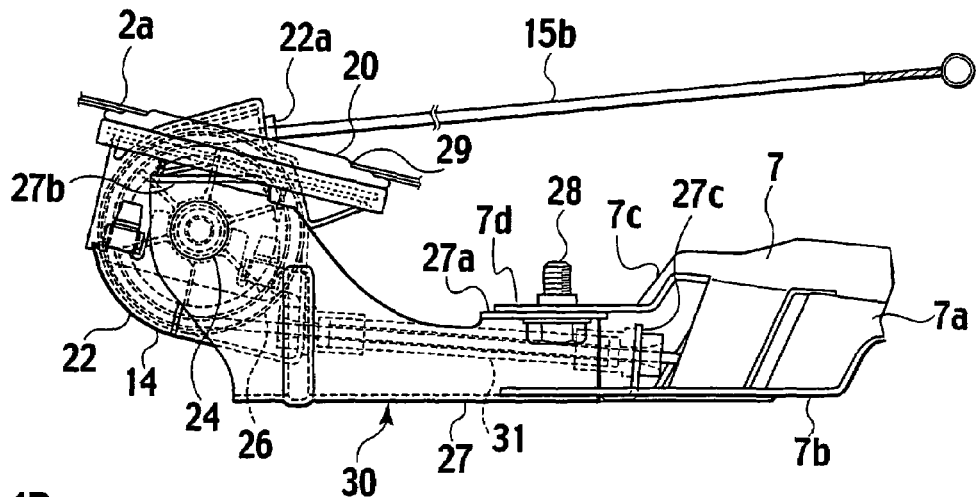
FIGS. 4A to 4C are enlarged transverse plan views of main portions of the opening-closing device for a vehicle according to the embodiment of the present invention, showing three attachment modes of a rear guide member when there are variations in a shape of a side panel in comparison with one another.
Figure 4B:
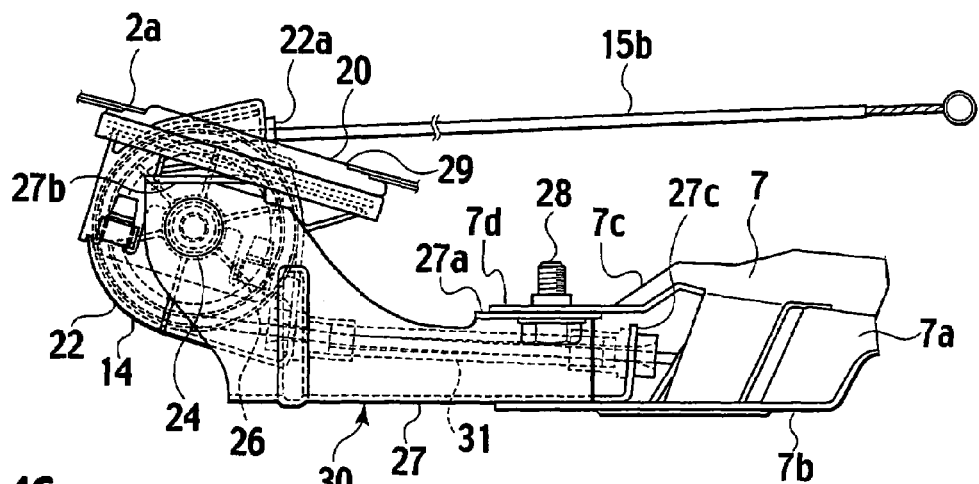
Figure 4C:
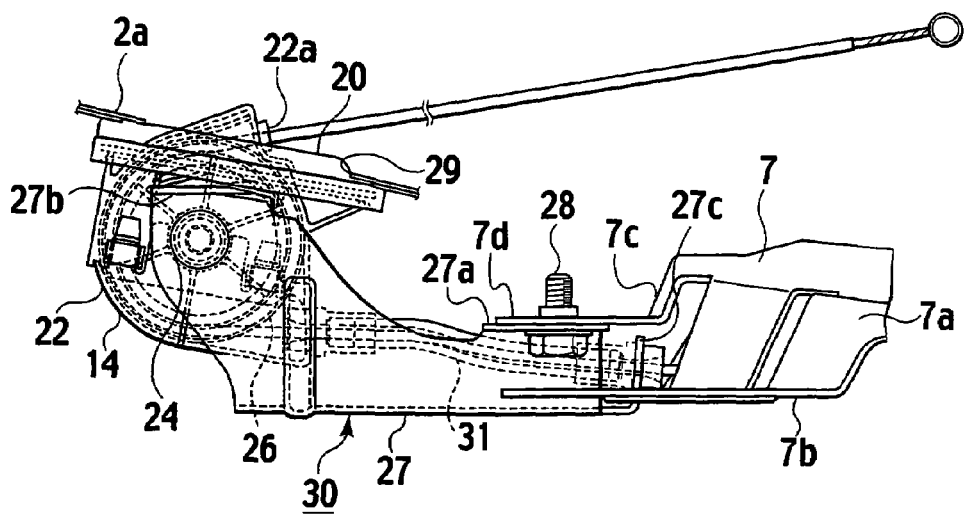
Figure 5A:
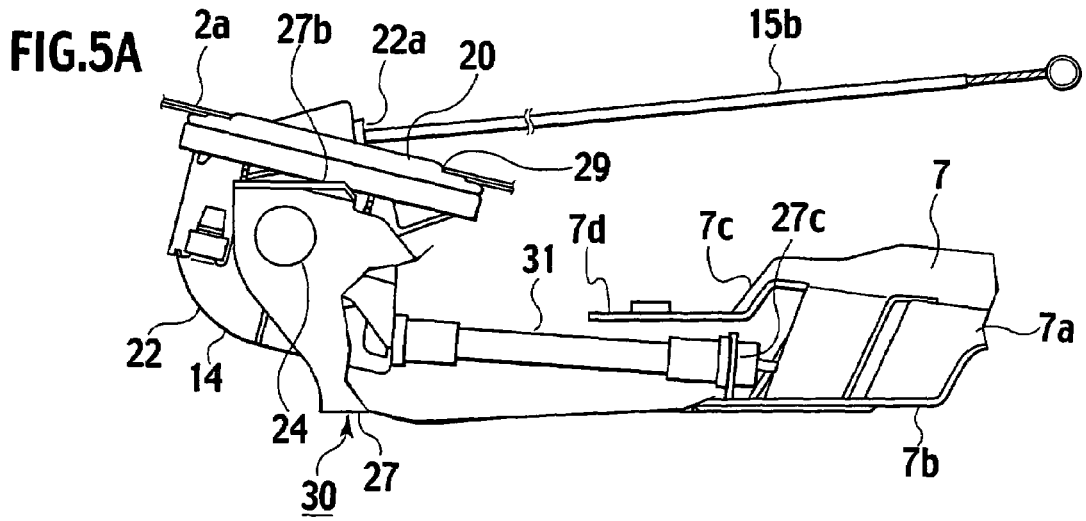
FIGS. 5A to 5C are enlarged transverse plan views similar to FIGS. 4A to 4C, showing the main portions of the opening/closing device for a vehicle according to the embodiment of the present invention, while partially cutting away the main portions concerned shown in FIGS. 4A to 4C.
Figure 5B:
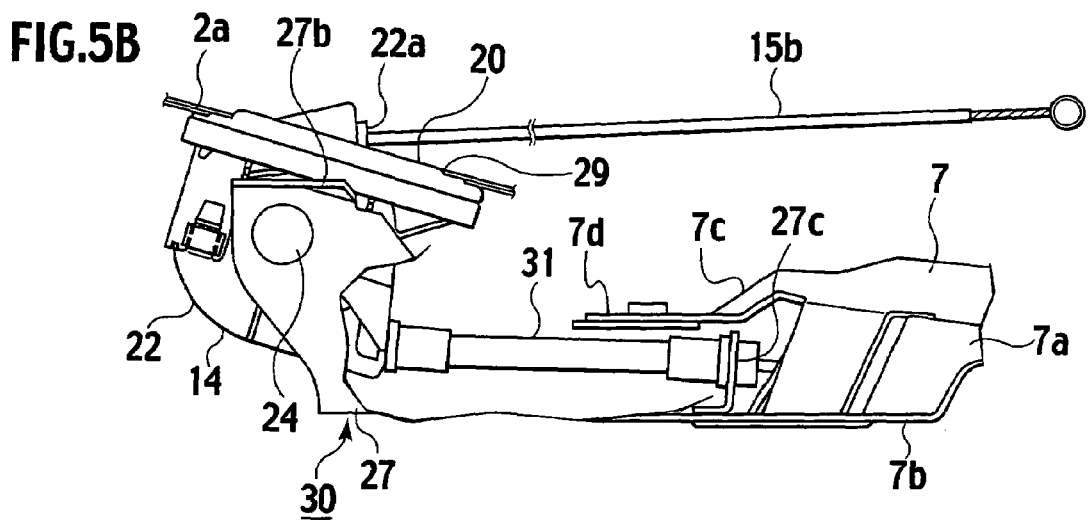
Figure 5C:
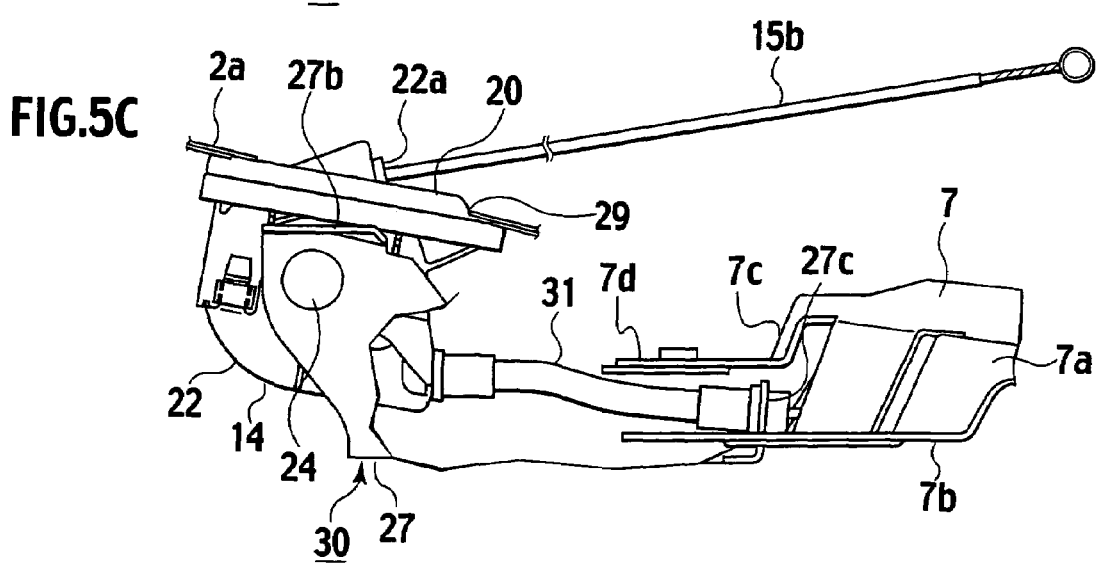

Description is made more specifically. FIGS. 4A to 4C and FIGS. 5A to 5C are views showing three modes when there are variations in the crosswise positional relationship between the board 7 attached onto the inner panel and the opening 29 in the outer panel 2a in comparison with one another. FIGS. 4A and 5A show a reference state. FIGS. 4B and 5B show a state where the opening 29 is deflected to the vehicle outside from the reference state. FIGS. 4C and 5C show a state where the opening 29 is deflected to the vehicle inside from the reference state. In any of the above-described cases, the guide member 14 is not positionally shifted from the opening 29, and is surely attached onto the side panel 2.

As described above, the deformable portion 7c is provided in order to make it possible to surely attach the guide member 14 onto the normal position of the side panel 2 in any of the cases shown in FIGS. 4A to 4C and FIGS. 5A to 5C. The deformable portion 7c just needs to be constructed so as to be elastically deformed or plastically deformed prior to the bracket 27 and the other portions of the board 7 when the attachment pieces 27b and 27b of the bracket 27 are screwed to the outer panel 2a. For this purpose, the deformable portion 7c may be thinned, may be formed of a material more flexible than the board 7, or may adopt a hinge structure.

On a base end of the bracket 27, a projection piece 27c oriented toward the vehicle outside is provided. Between the projection piece 27c and the pulley holder 22, a flexible sheath tube 31 guiding the wire 15b is provided and the respective ends of sheath tube 31 are connected to the projection piece 27c and the pulley holder 22.

Even in the case where the orientation of the pulley holder 22 with respect to the extended portion 30 is varied, such as when, as shown in FIG. 5C, the pulley holder 22 is attached onto the outer panel 2a while the deformable portion 7c is being largely deformed from the reference state shown in FIG. 5A, such variations of the orientation, a positional shift between the extended portion 30 and the pulley holder 22, and the like, can be absorbed by bending the sheath tube 31. In such a way, the wire 15b can always be guided smoothly. Specifically, even when there are variations in the shape of the vehicle body, and there are errors on the attachment position of the guide member 14 onto the vehicle body, the pulley holder 22 can be surely fixed to the vehicle body 1. In addition, the variations of the orientation of the pulley holder 22 with respect to the extended portion 30, variations of positions of both ends of the sheath tube 31 and a linear distance therebetween, which are accompanied with the above-described variations of the orientation, and the like, can be absorbed by bending the sheath tube 31. In such a way, the wire 15b can always be guided smoothly.

Note that the sheath tube 31 may be a tubular one that is not flexible. In this case, it is preferable that the respective ends of the sheath tube 31 be linked with the bracket 27 and the pulley holder 22 while being given a degree of freedom so as to be capable of performing some joint movement without being fixedly attached thereonto.

Next, functions of the embodiment according to the present invention are described.

When a door-opening operation switch (not shown) provided on the vehicle inside or the vehicle outside is operated in a door-closing state shown in FIG. 1, the motor 10 rotates positively. Rotation of the motor 10 is transmitted to the reel drum 9 through the reduction mechanism 11, and the reel drum 9 is rotated in a door-opening direction that is the clockwise direction in FIG. 3. The wire 15b is wound around the reel drum 9, the wire 15a is paid out from the reel drum 9, and the sliding door 4 connected to both of the wires 15a and 15b are thus moved backward.

When the sliding door 4 reaches the predetermined full-open position, a full-open detection sensor that is not shown or described is activated, the positive rotation of the motor 10 is stopped, and the sliding door 4 is maintained at the full-open position.

When a door-closing operation switch (not shown) provided on the vehicle inside or the vehicle outside is operated in a state where the sliding door 4 is stopped at the full-opening position or an appropriate intermediate position between the full-open position and the full-close position, the motor 10 is rotated reversely, and through the reduction mechanism 11, the reel drum 9 is rotated in a door-closing direction that is the counterclockwise direction in FIG. 3. By the rotation of the reel drum 9 in the door-closing direction, the wire 15a is wound around the reel drum 9, the wire 15b is paid out from the reel drum 9, and the sliding door 4 connected to both of the wires 15a and 15b is thus moved forward.

When the sliding door 4 reaches the full-close position, the sliding door 4 is engaged at the full-close position with a door latch that is not shown or described. In addition, a full-close detection sensor that is not shown or described is activated, the reverse rotation of the motor 10 is stopped, and the sliding door 4 is maintained at the full-close position.

Although the present invention has been described by the embodiment as described above, the present invention is not limited to the embodiment, and the constructions of the respective units can be replaced by arbitrary constructions having similar functions.

For example, though the rear guide member 14 is attached integrally with the drive unit 12 onto the vehicle body 1 in the above-described embodiment, the front guide member 13 may be attached integrally with the drive unit 12 onto the vehicle body 1.

As described above, it is a matter of course that the present invention incorporates various embodiments which are not described here.

What is claimed is:

1. An opening/closing device for a vehicle, comprising:
   an opening/closing body for opening/closing an opening provided in a vehicle body;
   a pair of guide members arranged on the vehicle body to be spaced from each other in an opening/closing direction of the opening/closing body;
   a drive unit provided between the guide members;
   a reel drum attached onto a board of the drive unit, the reel drum being rotatable in one direction and a direction reverse thereto;
   wires having ends connected to the opening/closing body, extended from a connected portion thereof in the opening/closing direction of the opening/closing body while being wound around both of the guide members and connected to the reel drum to be reeled to the reel drum in directions reverse to each other, the wires running around and along both of the guide members and opening/closing the opening/closing body by rotating the reel drum in the one direction and the direction reverse thereto; and
   an extended portion provided to be extended from the board of the drive unit toward one of the guide members, and attached onto the one of the guide members, wherein the extended portion comprises a deformable portion and a bracket attachment piece, and wherein the deformable portion is inclined over and in contact with the bracket attachment piece.

2. The opening/closing device for a vehicle according to claim 1, wherein the extended portion further comprises:
   a guide member attachment portion and
   a fixed portion being attached to the vehicle body,
   wherein the deformable portion is provided on a base of the extended portion and wherein the guide member attachment portion and the fixed portion are provided close to a tip end of the extended portion.

3. The opening/closing device for a vehicle according to claim 1, wherein
   each of the guide members comprises a guide pulley for guiding one of the wires.

4. The opening/closing device for a vehicle according to claim 1, wherein each of the guide members comprises:
   a pulley holder pivotally attached onto a tip end of the extended portion by a shaft oriented in a direction perpendicular to a longitudinal direction of the extended portion, and pressed fit on the vehicle body through a packing;
   a guide pulley for guiding the wire, the guide pulley being pivotally attached onto the pulley holder by the shaft; and
   a flexible sheath tube for guiding the wire, the sheath tube having one end-connected to the pulley holder and the other end connected to a portion of the extended portion, which is close to a base of the extended portion.

* * * * *